(12) United States Patent
Klenk et al.

(10) Patent No.: US 7,017,913 B2
(45) Date of Patent: Mar. 28, 2006

(54) AXIAL SHAFT SEAL

(75) Inventors: Thomas Klenk, Eppelheim (DE);
Eberhard Bock, Moerlenbach (DE);
Thomas Kramer, Zotzenbach (DE);
Werner Hufnagel, Grossbettlingen (DE); Martin Heldmann, Lindenfels (DE); Markus Clemens, Reichelsheim (DE); Gilbert Pataille, Corlee (FR)

(73) Assignee: Carl Freudenberg KG, Weinheim (DE)

( * ) Notice: Subject to any disclaimer, the term of this patent is extended or adjusted under 35 U.S.C. 154(b) by 0 days.

(21) Appl. No.: 10/603,309

(22) Filed: Jun. 25, 2003

(65) Prior Publication Data

US 2004/0070151 A1  Apr. 15, 2004

(30) Foreign Application Priority Data

Jun. 26, 2002  (DE) ................................ 102 28 621

(51) Int. Cl.
*F16J 15/32* (2006.01)
(52) U.S. Cl. .................. 277/317; 277/353; 277/561
(58) Field of Classification Search ................ 277/317, 277/346, 348, 349, 351, 353, 561, 549
See application file for complete search history.

(56) References Cited

U.S. PATENT DOCUMENTS

| | | | | |
|---|---|---|---|---|
| 3,438,639 A | * | 4/1969 | Paulsen ...................... 277/353 |
| 4,998,740 A | * | 3/1991 | Tellier ......................... 277/362 |
| 5,085,444 A | * | 2/1992 | Murakami et al. .......... 277/503 |
| 5,348,312 A | * | 9/1994 | Johnston ..................... 277/375 |
| 5,387,040 A | * | 2/1995 | Firestone et al. ........... 384/477 |

FOREIGN PATENT DOCUMENTS

DE        1893773        5/1964

* cited by examiner

*Primary Examiner*—Alison K. Pickard
(74) *Attorney, Agent, or Firm*—Harness, Dickey & Pierce, P.L.C.

(57) ABSTRACT

An axial shaft seal disposed between a housing wall and a rotating shaft includes an outer ring insertable into the housing wall in a stationary and sealing manner and an inner ring connectable to the shaft in a non-twisting and sealing manner. The outer ring includes a sleeve having a polymer material extending radially inward and having a spring bellows form. A radially inward end portion of the sleeve has a first sealing surface. The inner ring includes a ring flange extending radially outward so as to provide a second sealing surface for axially mating the first sealing face.

19 Claims, 3 Drawing Sheets

AXIAL SHAFT SEAL

Priority is claimed to German patent application no. DE 102 28 621.3, filed on Jun. 26, 2002, the subject matter of which is incorporated by reference herein.

BACKGROUND

The present invention relates to an axial shaft seal between a housing wall or the like and a shaft rotating therein. Such axial shaft seals are known in various embodiments. Their different designs are usually due to the fact that there are special sealing problems. One of these problem cases is in achieving a seal even when the rotating shaft executes substantial axial movements.

German utility model DE 1 893 773 describes an axial shaft seal in which the axial sealing ring of the seal also moves to a slight extent with an axial displacement of the shaft. Therefore, a soft and relatively long seal is achieved. However, this axial seal necessitates a shaft collar being placed on the shaft, so that the sealing lip rests on it, or a shoulder at the end of the shaft, forming an end face for the sealing lip. However, major axial movements of the shaft cannot be accommodated in view of the structural design of the seal.

SUMMARY OF THE INVENTION

An object of the present invention is to design an axial shaft seal so that a reliable seal is achieved even with great axial play and radial deflection of the shaft in particular. The seal should also have the simplest possible design and should permit easy assembly.

The present invention provides an axial shaft seal between a housing wall or the like and a shaft rotating therein. The axial shaft seal (20) is composed of an outer ring (3) insertable into the housing wall (21) in a stationary and sealing mount, having a radially inward-directed sleeve (22) made of a polymer material in the form of a spring bellows having one or more axially directed sealing faces (13) on its inside edge (9). The axial shaft seal is also composed of an inner ring (4) connectable to the shaft (6) in a twist-proof and sealing manner, having a radially outward-directed ring flange (10) designed as an axial mating sealing face (25).

This seal allows a substantial radial play and axial play of the shaft to be accommodated. It also allows a substantial inclination of the shaft. It has a lower power loss and thus there is almost no coking of oil, so this results in a long service life. It is simple and inexpensive to manufacture and also allows simple assembly and dismantling.

In a preferred embodiment, the sleeve is provided with an essentially radially directed circular ring on the inside. This circular ring is designed as a sealing face. The sealing face may be provided with lubricant-recirculating grooves in a known manner. It is also possible to provide the sealing face with a friction-reducing coating, preferably made of PTFE.

It is advantageous if the sleeve is shaped as folded bellows, allowing simple manufacture and handling of the sleeve. When installed, it is advantageous if the bellows of the sleeve open toward the lubricant side of the seal, resulting in good lubrication of sealing faces in particular and therefore low friction and low wear.

To increase the rigidity of the outer ring, the adhesive part of the outer ring may be provided with a reinforcement made of a tough, hard material. It is also possible to insert a reinforcement into the circular ring on the sleeve.

According to another possibility for recirculating the lubricant, the ring flange may also be provided with grooves.

The inner ring is preferably made of metal. If necessary, other materials may also be used. For example, plastics may also be used in many cases.

For assembly purposes or to reduce frictional forces, the inner ring may be at least partially sheathed with a polymer material.

It is advantageous if the inner ring is equipped with projections directed radially inward or, even better, with a circular flange, to provide an axial stop at a shoulder on the shaft.

In another embodiment of the present invention, the ring flange of the inner ring may be provided with a radial extension designed on its outer collar as a transmitter wheel or a multipole wheel, cooperating with a sensor inserted into the housing wall to measure the rotational speed and/or shaft movement. Another possibility for performing these measurements has the cylindrical part of the inner ring designed as a transmitter wheel or a multipole wheel, which cooperates with a sensor held in place by a supporting flange mounted in the housing wall. It is also possible for the cylindrical part of the inner ring to be designed as a transmitter wheel or multipole wheel and for the outer ring of the seal to be mounted in an auxiliary ring having a dirt-repellant washer, preferably made of a nonwoven material.

BRIEF DESCRIPTION OF THE DRAWINGS

The present invention is explained in greater detail below on the basis of several exemplary embodiments illustrated in the drawings, in which.

DETAILED DESCRIPTION

Figure 1:
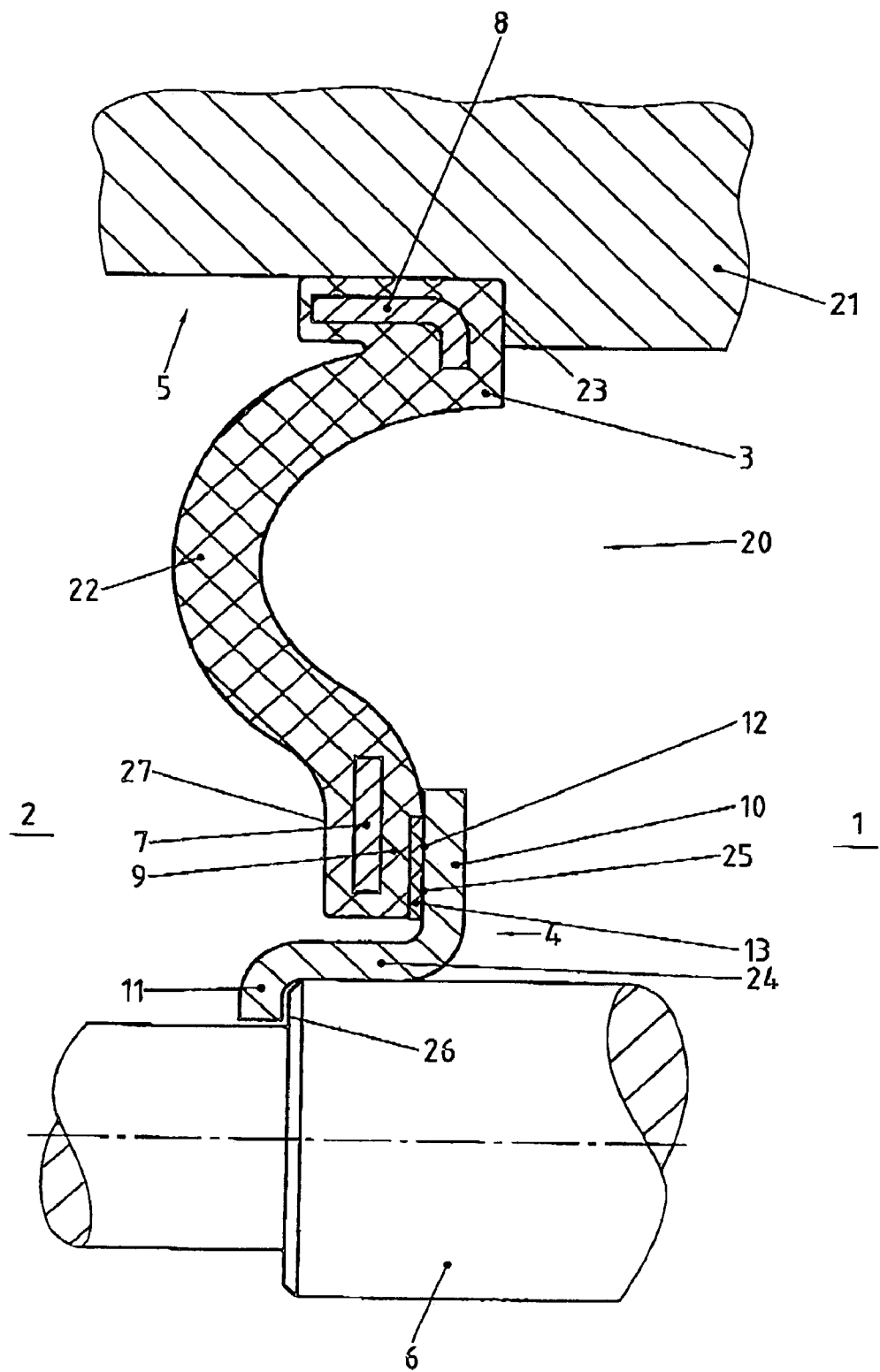
FIG. 1 shows a sectional view of the basic design of the axial shaft seal.

FIG. 1 shows a sectional view of an axial shaft seal 20 inserted into housing wall 21, sealing the gap between housing wall 21 and shaft 6. Axial shaft seal 20 is composed of two parts, namely outer ring 3, which is insertable into housing wall 21 in a stationary and sealing position, and inner ring 4. Outer ring 3 has a radially inward-directed sleeve 22 made of a polymer material in the shape of a spring bellows. Inside sleeve 22 is designed as a radial projection and has sealing face 13. To increase the rigidity of outer ring 3 or inside edge 9, they may be provided with reinforcements of a tough, hard material 8 and/or 7 in the form of a ring. Bore 5 in housing 21 is provided with a shoulder 23 forming a stop at which outer ring 3 comes to rest.

Inner ring 4 is placed on shaft 6. It has a cylindrical middle part 24 and a ring flange 10 directed radially outward and having mating sealing face 25 for sealing face 13 of inside edge 9 of sleeve 22. Inner ring 4 is placed on shaft 6 in a twist-proof and sealing manner. It is equipped with circular flange 11, which rests on shoulder 26 of shaft 6, thereby determining the position of inner ring 4.

Inside edge 9 of sleeve 22 is designed as an essentially radially directed circular ring. In the present example, the circular ring is provided with a sealing face 13. This sealing face 13 may be provided with lubricant-recirculating grooves 12, which may be applied directly to sealing face 13. However, it is also possible to provide sealing face 13 with a friction-reducing coating, preferably made of PTFE. Sleeve 22 is preferably situated so that it is open toward lubricant side 1 of the seal. However, the reverse arrangement is also possible, i.e., the bellows of sleeve 22 pointing toward ambient side 2. To make this arrangement possible, a corresponding design may be provided on outer side 27 of inner ring 9 and it may be designed as a sealing face in the same way as on the opposite side.

The radial orientation of inside edge 9 may be inherent in the design, but it is also possible to design sleeve 22 with inside edge 9 so that before its assembly opposite sleeve 22, the inner ring is angled in the direction of ring flange 10 of inner ring 4, and it is pushed in its radial direction only during assembly. In this regard, the inward edge portion or inside edge 9 may deviate from a radial normal direction by up to a maximum of 30°, when not mating the sealing surface 25.

In the embodiment shown here, the inner ring is made of metal, but it is also possible to manufacture the inner ring of plastic, e.g., to at least partially sheath it with a polymer material, as is the case in the following figures.

Figure 2:
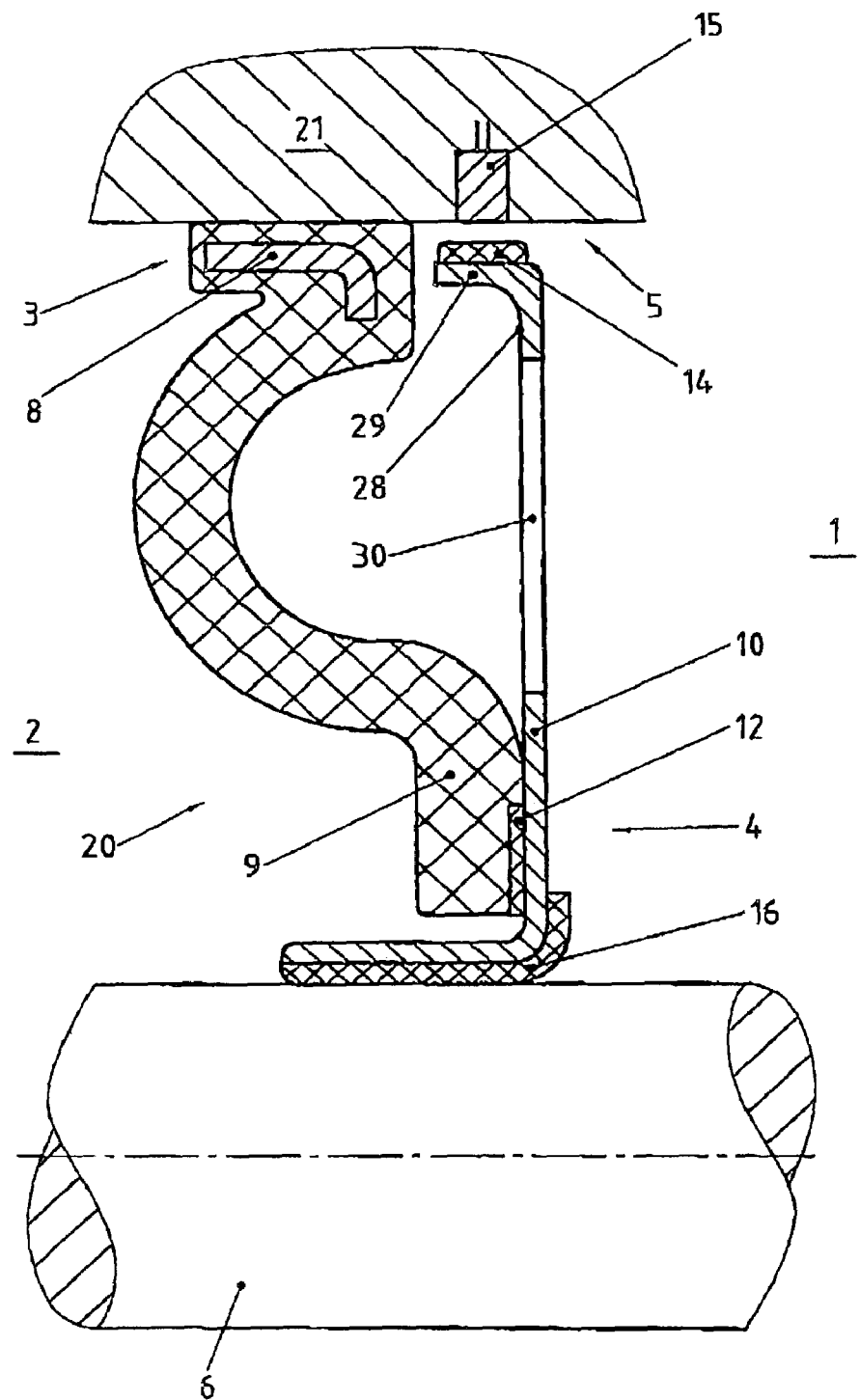
FIGS. 2 and 3 show the axial shaft seals having an inner ring, which carries a multipole wheel.

FIG. 2 shows an axial shaft seal 20 having a design comparable to that in FIG. 1, with inner ring 4 being provided with a sheathing 16 of a polymer material on its inside surface. This sheathing 16 results in a very good sealing seating of inner ring 4 on shaft 6. Ring flange 10 of inner ring 4 is provided with a radial extension 28, which carries multipole wheel 14 on its outer collar 29. Multipole wheel 14 cooperates with sensor 15 inserted into housing 21 and the rotational speed and/or the shaft movement and other factors may be measured. Extension 28 may be provided with recesses 30 on its circumference for reasons of weight and/or to facilitate lubricant access to the sealing faces.

This design may also be modified without going beyond the idea of the invention if, for example, it is not desirable for extension 28 to be present in the lubricant area of the seal. In this case the extension may also be applied to outside 2 of seal 20.

Figure 3:
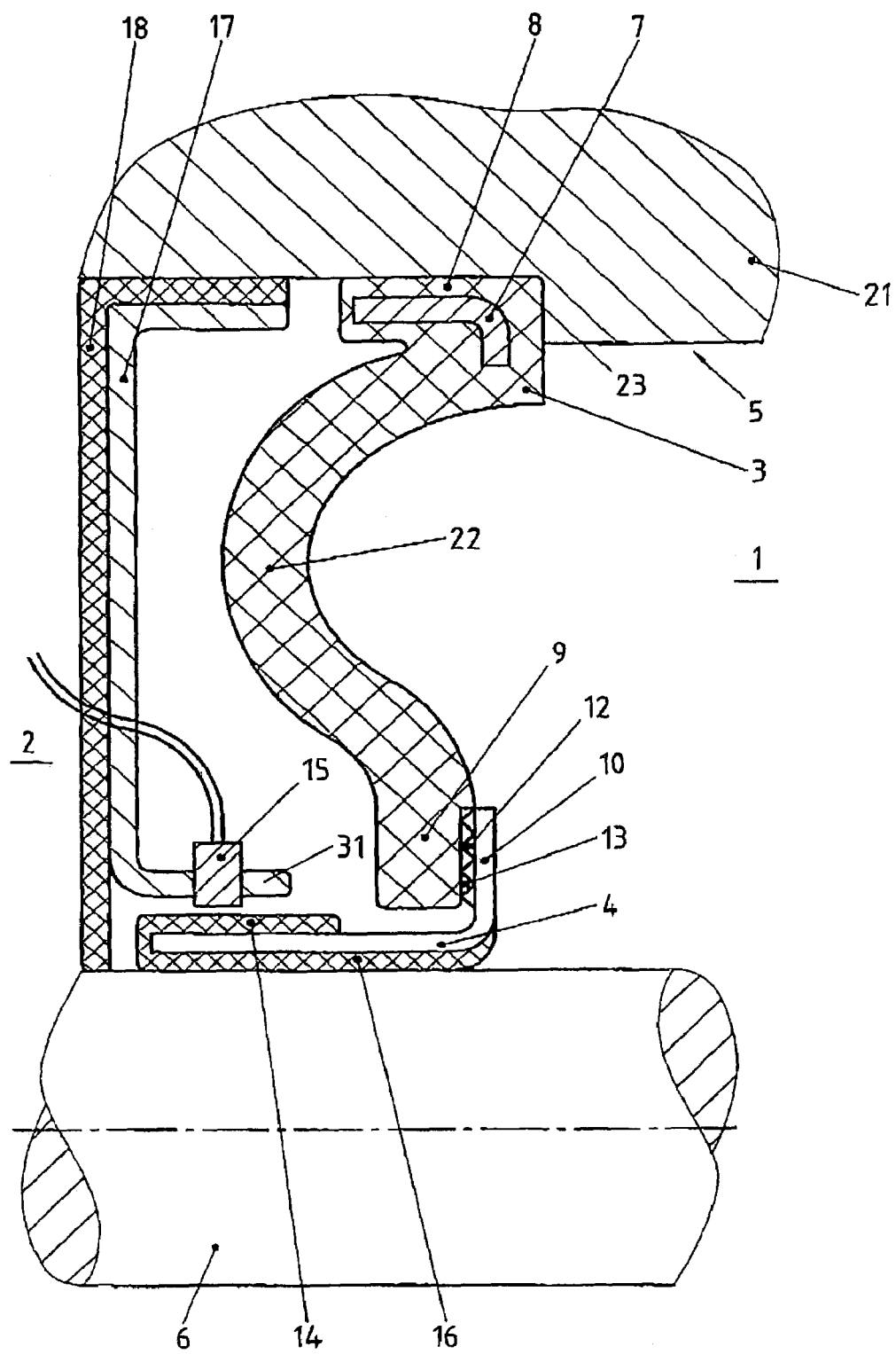

One possibility for mounting multipole wheel 14 and sensor 15 is shown in FIG. 3, where outer ring 3 having sleeve 22 and inner ring 4 having ring flange 10 correspond essentially to the embodiment according to FIG. 1. In addition, an auxiliary bracket 17 is also mounted here, having sensor 15 on its flange 31 directed inward, the sensor being situated opposite multipole wheel 14 and the latter being situated on inner ring 4. Auxiliary ring 17 may be provided with nonwoven sealing apron 18 surrounding shaft 6 with a seal. It is also conceivable to mount a dirt-repellant flange on inner ring 4 toward the outside.

What is claimed is:

1. An axial shaft seal disposed between a housing wall and a rotating shaft, the axial shaft seal comprising:
    an outer ring insertable into the housing wall in a stationary and sealing manner, the outer ring including a sleeve including a polymer material having a curved bellows form and providing a spring, the curved bellows form extending radially inward over its entire length, a radially inward end portion of the sleeve having a first sealing surface; and
    an inner ring connectable to the shaft in a non-twisting and sealing manner and including a ring flange extending radially outward so as to provide a second sealing surface for axially mating the first sealing surface,
    wherein the spring urges the first sealing surface against the second sealing surface; and
    the inward end portion deviates from a radial normal direction by up to a maximum of 30°, when not axially mating the second sealing surface.

2. The axial shaft seal as recited in claim 1, wherein the inward end portion of the sleeve includes a circumscribing ring extending in a radial direction.

3. The axial shaft seal as recited in claim 2, wherein the circumscribing ring includes a reinforcing plate.

4. The axial shaft seal as recited in claim 2, wherein the circumscribing ring includes one or more sealing surfaces.

5. The axial shaft seal as recited in claim 1, wherein the first sealing surface includes lubricant-recirculating grooves.

6. The axial shaft seal as recited in claim 1, wherein the first sealing surface includes a friction-reducing coating.

7. The axial shaft seal as recited in claim 6, wherein the coating includes PTFE.

8. The axial shaft seal as recited in claim 6, wherein the sleeve includes a folded bellows.

9. The axial shaft seal as recited in claim 8, wherein the bellows open toward a lubricant side of the seal.

10. The axial shaft seal as recited in claim 1, wherein the outer ring includes a reinforcement member.

11. The axial shaft seal as recited in claim 1, wherein the ring flange includes lubricant-recirculating grooves.

12. The axial shaft seal as recited in claim 1, wherein the inner ring is made of metal.

13. The axial shaft seal as recited in claim 1, wherein the inner ring is at least partially sheathed with a polymer material.

14. The axial shaft seal as recited in claim 1, wherein the inner ring includes a plurality of projections extending radially inward for providing an axial stop with a shoulder of the shaft.

15. The axial shaft seal as recited in claim 1, wherein the inner ring includes a circumscribing flange for providing an axial stop with a shoulder of the shaft.

16. An axial shaft seal disposed between a housing wall and a rotating shaft, the axial shaft seal comprising:
    an outer ring insertable into the housing wall in a stationary and sealing manner, the outer ring including a sleeve including a polymer material extending radially inward and having a spring bellows form, a radially inward end portion of the sleeve having a first sealing surface;
    an inner ring connectable to the shaft in a non-twisting and sealing manner and including a ring flange extending radially outward so as to provide a second sealing surface for axially mating the first sealing surface, wherein the ring flange includes a radial extension having an outer portion; and
    a sensor disposed at the housing wall and one of a transmitter wheel and a multipole wheel cooperating with the sensor to measure at least one of a rotational speed and shaft displacement.

17. An axial shaft seal disposed between a housing wall and a rotating shaft, the axial shaft seal comprising:
    an outer ring insertable into the housing wall in a stationary and sealing manner, the outer ring including a sleeve including a polymer material extending radially inward and having a spring bellows form, a radially inward end portion of the sleeve having a first sealing surface;
    an inner ring connectable to the shaft in a non-twisting and sealing manner and including a ring flange extending radially outward so as to provide a second sealing surface for axially mating the first sealing surface, wherein the inner ring includes a cylindrical part; and
    an auxiliary flange disposed on the housing wall, a sensor disposed on the auxiliary flange one of a transmitter wheel and a multipole wheel for cooperating with the sensor.

18. An axial shaft seal disposed between a housing wall and a rotating shaft, the axial shaft seal comprising:
- an outer ring insertable into the housing wall in a stationary and sealing manner, the outer ring including a sleeve including a polymer material extending radially inward and having a spring bellows form, a radially inward end portion of the sleeve having a first sealing surface;
- an inner ring connectable to the shaft in a non-twisting and sealing manner and including a ring flange extending radially outward so as to provide a second sealing surface for axially mating the first sealing surface, wherein the inner ring includes a cylindrical part that includes one of a transmitter wheel and a multipole wheel; and
- an auxiliary ring having a non-repellant washer mounted, the outer ring being mounted in the auxiliary ring.

19. The axial shaft as recited in claim 18, wherein the washer is made of a non-woven material.

* * * * *